US012333323B2

(12) United States Patent
Heinen et al.

(10) Patent No.: US 12,333,323 B2
(45) Date of Patent: Jun. 17, 2025

(54) SYSTEMS AND METHODS FOR PROVIDING A VIRTUAL MACHINE LINK TO PROCESS CONTROLS

(71) Applicants: Monsanto Technology LLC, St. Louis, MO (US); Bayer Aktiengesellschaft, Leverkusen (DE)

(72) Inventors: Guilherme Frederico Heinen, North Rhine-Westphalia (DE); Luiz Guilherme Neves Da Silva, São Paulo (BR); Junqiu Yang, St. Louis, MO (US)

(73) Assignees: MONSANTO TECHNOLOGY LLC, Saint Louis, MO (US); BAYER AKTIENGESELLSCHAFT, Leverkusen (DE)

( * ) Notice: Subject to any disclaimer, the term of this patent is extended or adjusted under 35 U.S.C. 154(b) by 462 days.

(21) Appl. No.: 17/838,006

(22) Filed: Jun. 10, 2022

(65) Prior Publication Data

US 2022/0398122 A1 Dec. 15, 2022

Related U.S. Application Data

(60) Provisional application No. 63/210,426, filed on Jun. 14, 2021.

(51) Int. Cl.
*G06F 9/455* (2018.01)
*G05B 19/418* (2006.01)
(52) U.S. Cl.
CPC ..... *G06F 9/45558* (2013.01); *G05B 19/4185* (2013.01); *G06F 2009/4557* (2013.01); *G06F 2009/45595* (2013.01)
(58) Field of Classification Search
None
See application file for complete search history.

(56) References Cited

U.S. PATENT DOCUMENTS

2007/0037708 A1 2/2007 Prosch et al.
2018/0059921 A1* 3/2018 De Ligt ............... G05B 19/409
(Continued)

FOREIGN PATENT DOCUMENTS

CN 101875668 B * 10/2021 ............... G07F 9/38
WO WO-2016155857 A1 * 10/2016 ............. F01K 13/02
WO WO-2021098952 A1 * 5/2021 ........... B01D 9/0063

OTHER PUBLICATIONS

Esmaeilzadeh, K. "Remote Monitoring and Control of Industrial Equipment Through OPC UA and Cloud Computing." Tampere University, Automation Engineering. Factory Automation and Industrial Informatics, Master's Thesis. May 2021 (99 pages).

(Continued)

*Primary Examiner* — Charles E Anya
(74) *Attorney, Agent, or Firm* — Harness, Dickey & Pierce, P.L.C.

(57) ABSTRACT

Systems and methods are provided for use in communicating with a distributed control system (DCS) associated with a manufacturing plant. One example system includes a virtual machine hosted in a computing device and coupled to the DCS via a network connection, where the virtual machine includes a controller server and a controller client. The controller server includes a controller specific to a process of the plant, and the controller client is configured to host communication between the controller server in the virtual machine and the DCS of the plant. The controller client, then, is further configured to receive a message from the DCS, via the network connection, transform the message into a JSON message, and communicate the JSON message to the controller server.

5 Claims, 3 Drawing Sheets

(56) References Cited

U.S. PATENT DOCUMENTS

| | | |
|---|---|---|
| 2018/0321662 A1 | 11/2018 | Nixon et al. |
| 2020/0133224 A1* | 4/2020 | Popp .................... G05B 19/188 |
| 2020/0310394 A1 | 10/2020 | Wouhaybi et al. |
| 2022/0179398 A1* | 6/2022 | Putman .................... G06F 8/60 |

OTHER PUBLICATIONS

Han, S. et al. RT-DAP: "A Real-Time Data Analytics Platform for Large-Scale Industrial Process Monitoring and Control." 2018 IEEE International Conference on Industrial Internet (ICII) IEEE. Feb. 22, 2018 (pp. 59-68). IEEE. Feb. 22, 2018.

* cited by examiner

SYSTEMS AND METHODS FOR PROVIDING A VIRTUAL MACHINE LINK TO PROCESS CONTROLS

CROSS-REFERENCE TO RELATED APPLICATION

This application claims the benefit of, and priority to, U.S. Provisional Application No. 63/210,426, filed on Jun. 14, 2021. The entire disclosure of the above application is incorporated herein by reference.

FIELD

The present disclosure generally relates to systems and methods for use in providing a virtual machine link to process controls at a manufacturing plant, etc., where the virtual machine includes, for example, an intelligent controller.

BACKGROUND

This section provides background information related to the present disclosure which is not necessarily prior art.

It is known to implement various processes in the context of industrial controls. The processes may be defined, for example, to produce materials such as specific chemicals from a variety of raw materials, by bringing the raw materials together under specific conditions (e.g., temperature, pressure, etc.), or otherwise. Depending on the particular processes, computer intelligence may be employed to control certain conditions of the processes, based on certain measured parameters of the processes. In doing so, the computer intelligence may be designed to manipulate and/or alter inputs to the processes (e.g., set points, etc.) based on feedback, to ensure the proper conditions of the processes are maintained as desired.

As part of the above, the computer intelligence may generally be deployed in controllers of the processes, for example, as part of distributed control systems (DCSs) at locations where the processes are implemented. An example DCS may include, for example, a DeltaV™ DCS implemented in an industrial plant, whereby the computer intelligence may be deployed in controllers of a process (or processes) as part of the DeltaV™ DCS.

SUMMARY

This section provides a general summary of the disclosure, and is not a comprehensive disclosure of its full scope or all of its features.

Example embodiments of the present disclosure generally relate to systems for use in communicating with distributed control systems (DCSs) associated with manufacturing plants. In one example embodiment, such a system generally includes a virtual machine hosted in a computing device and coupled to the DCS via a network connection, where the virtual machine includes a controller server and a controller client. The controller server includes a model (and/or a controller implementing the model whereby the controller may be considered an implementation of the model) specific to a process of the plant, and the controller client is configured to host communication between the controller server in the virtual machine and the DCS of the plant. The controller client is further configured to receive a message from the DCS, via the network connection, transform the message into a JSON message, and communicate the JSON message to the controller server. In connection therewith, and without limitation, the plant of the system may include a glyphosate production plant, where the process includes a process implemented at the plant to produce glyphosate.

Example embodiments of the present disclosure also generally relate to computer-implemented methods for controlling production of products at manufacturing plants. In one example embodiment, such a method generally includes receiving, by a controller client included in a virtual machine hosted in a cloud platform, a message from a distributed control system (DCS) of a manufacturing plant associated with a process to produce a product, where the manufacturing plant includes a component for controlling a set-point of the process and where the received message is in a first message format specific to the DCS. The method then also includes transforming, by the controller client, the message received from the DCS from the first message format into a second message format different from the first message format; communicating, by the controller client, the message in the second message format to a controller server included in the virtual machine; receiving, by the controller client, a response message from the controller server in the second message format where the response message includes an action to be implemented at the manufacturing plant, as determined by a model (and/or a controller implementing the model whereby the controller may be considered an implementation of the model) specific to the process at the manufacturing plant, based on the operational state of the process; transforming, by the controller client, the respond message from the second message format to the first message format; and communicating, by the controller client, the response message including the action, in the first message format, to the DCS. The method then further includes, in response to the response message in the first message format, adjusting, by the DCS, the component of the manufacturing plant to alter the set-point of the process based on the action included in the response message.

Example embodiments of the present disclosure also generally relate to non-transitory computer-readable storage media including executable instructions for controller clients specific to processes of plants. In one example embodiment, the executable instructions, when executed by at least one processor, cause the at least one processor to host communication between a controller server in a virtual machine and a distributed control system (DCS) of the plant, which comprises the steps of: receiving a message from the DCS, via a network connection; transforming the message into a JSON message; and communicating the JSON message to the controller server Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are provided for purposes of illustration only and are not intended to limit the scope of the present disclosure.

A variety of processes may be implemented at manufacturing plants to produce products (e.g., compositions, compounds, devices, etc.) from different raw materials, etc. Some processes may be relatively simple, while other processes may be more complex. Regardless, it may be necessary, or desired, to implement computer-based control of the processors, or of certain ones of the processes, or of certain aspects of the processes, where a computer controls inputs to the processes based on observed conditions (e.g., parameters, feedback, etc.) of the processes. In certain implementations, it may further be desired to train models based on the inputs, feedback, and/or conditions of the processes, and then deploy the models to control the processes. When the models are built apart from the processes, communication between the models and the manufacturing plants implementing the processes (and specifically, distributed control systems (DCSs) of the manufacturing plants) may be impeded, or blocked, for example, by security implemented in the DCSs or in operating systems upon which the DCSs are running, and/or by network security imposed thereon.

Uniquely, the systems and methods herein provide for virtual machine implementation of a model (via a controller or agent) trained to control a process at a manufacturing plant, whereby a link between the model and a control system (e.g., a DCS, etc.) of the plant is readily achievable via, or through, or by way of, etc. a virtual machine. In particular herein, the virtual machine is implemented in connection with the model, whereby a server (e.g., a model server or a controller server, etc.) and a client (e.g., a model client or a controller client, etc.) are executed. In turn, the server executes the model, whereby inputs from the process at the plant (which may exhibit linear, non-linear and/or complex dynamic behaviors) are consumed (e.g., by the model, etc.), and output controls for the process are provided. And, the client provides for communication to and from the manufacturing plant (e.g., transformation of data between formats/protocols, etc.). In connection therewith, the control system is a disparate software product as compared to the virtual machine, whereby the client coordinates inputs provided from the control system to the server for consumption by the model, and outputs provided from the server (based on the model) to the control system of the plant for implementation by the control system.

As such, by way of the systems and methods herein, models (as implemented by via controllers or agents) for controlling processes at manufacturing plants may be trained and implemented apart from specific control systems (e.g., apart from a specific DCS, etc.) of the plants, yet may still be included in control loops for the control systems and the associated plant processes. In this manner, the systems and methods herein overcome communication barriers between disparate software products utilized for such process controls (i.e., the virtual machine and the plant control system as described above) and provide synergistic value regarding process enhancement and/or optimization at the manufacturing plants (for the given processes).

Figure 1:
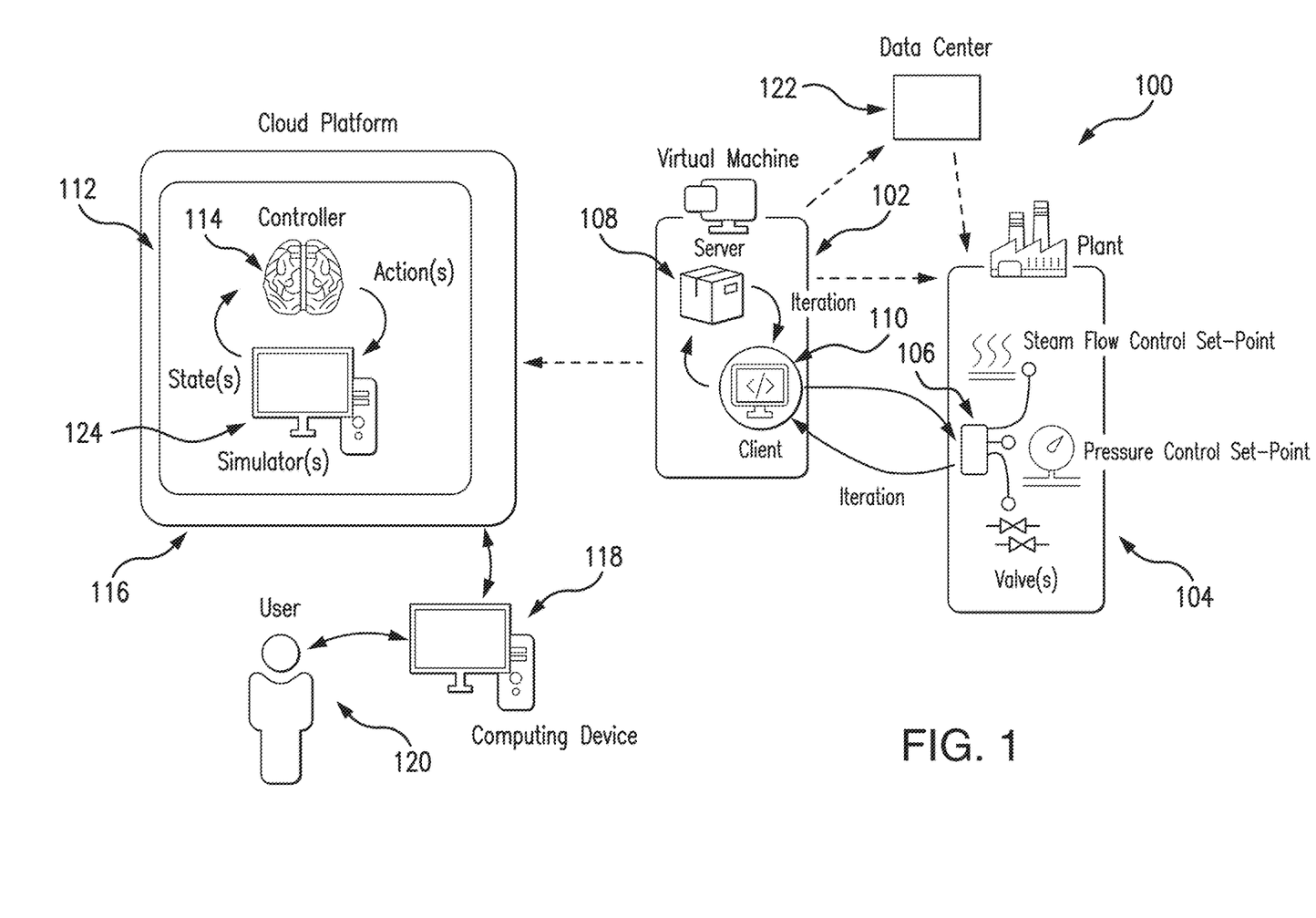
FIG. 1 is a block diagram of an example system of the present disclosure suitable for use in providing a virtual machine link to process controls associated with processes at a production location (e.g., at a plant, etc.)

FIG. 1 illustrates an example system 100 in which one or more aspects of the present disclosure may be implemented. Although parts of the system 100 are presented in one arrangement, it should be appreciated that other example embodiments may include the same or different parts arranged otherwise, for example, depending on particular manufacturing plants included in the system, particular processes involved at the manufacturing plants, particular controls involved in producing products at the manufacturing plants, implementations associated with controllers at the manufacturing plants, control systems implemented at the manufacturing plants, network security, etc.

As shown in FIG. 1, the illustrated system 100 generally includes a virtual machine 102, a plant 104 confirmed to implement a process (or multiple processes) in connection with producing a product, and a distributed control system (DCS) 106 disposed at the plant 104 and configured to provide control of the process(es).

In this example embodiment, the virtual machine 102 includes a controller server 108 and a controller client 110, as described in more detail below. In addition, the virtual machine 102 is hosted in a physical computing device. In connection therewith, the physical computing device may be disposed at the plant 104, or it may be disposed apart from the plant 104 (as indicated by the dashed lines in FIG. 1 extending from the virtual machine 102). For example, in some embodiments, the virtual machine 102 may be included in a dedicated computing device physically present at the plant 104. In some embodiments, the virtual machine 102 may be included in or implemented in (or hosted in) a data center 122 associated with the plant 104 (and potentially multiple other plants) whereby the data center 122 may disposed away from the plant 104 or included in the plant 104 (as indicated by the dashed line in FIG. 1 between the data center 122 and the plant 104). Further, in some embodiments the virtual machine 102 may be included in (or may be hosted in) cloud platform 116 apart from the plant 104 and operated, for example, by a third party (e.g., the Azure™ cloud platform, the AWS™ cloud platform, etc.).

Generally, the plant 104 is associated with the process (for use in producing a product at the plant 104), and provides a physical place (e.g., including one or more buildings, machines, structures, etc.) for implementation of the process. The plant 104 includes components specific to the process, such as, for example, vessels, towers, mixers, valves, controllers, sensors, etc., each of which is selected and/or implemented as part of the process. In connection therewith, the components may be operated, actuated, manipulated, etc. to combine input materials to make the given product, to process the materials as needed (either before they are combined or after), and to process the resulting product once formed. It should be appreciated that the components may also provide options for reading one or more conditions of the process (e.g., temperatures, pressures, rates, etc.), via one or more sensors, for example, and options to control aspects of the process (e.g., temperature settings, mixtures, flow settings, pressure settings, etc.) and/or performance of the process (e.g., options to limit process variation, reduce steam consumption, etc.), etc. The process, then, is a series of steps, operations, and/or conditions that are intended to effect a transformation of one or more raw materials into an output or desired product (e.g., a desired material, etc.).

In some example embodiments, the process at the plant 104 may include an evaporative crystallization process. In connection therewith, the process may include various product feeders, holding vessels and/or tanks, feed vessels and/or tanks, other vessels and/or tanks, evaporators, heaters, valves, high-pressure steam devices, etc. for use in forming crystals (e.g., by heating a solution containing a solvent and soluble component, etc.). Sensors may then be provided to read, monitor, track, etc. fluid levels (e.g., EFT liquid levels, etc.), flow rates (e.g., steam flow rates, etc.), pressures (e.g., pressure control points, etc.), etc. in the plant 104 (as generally shown in FIG. 1). In some example embodiments, the process may include the production of glyphosate or another herbicide, but may be otherwise in other embodiments.

The DCS 106 includes various components disposed through the plant 104, which provide for reading conditions of the plant 104 and/or the process, and for controlling implements, devices, etc. (e.g., vessels, towers, mixers, valves, controllers, motors, etc.) intended to control inputs of the process. For example, the DCS 106 may include (or may be implemented in connection with) one or more components associated with, included with, and/or coupled to one or more valves at the plant 104 disposed to control an evaporator pressure set-point, or a steam pressure set-point, or a pressure set-point, etc. (as shown in FIG. 1, for example), where control signals from the DCS 106 (e.g., based on a model (or models) implemented by controller 114, as explained more below, etc.) actuate, manipulate, etc. the one or more valves to affect the particular set-point(s). In this example embodiment, the DCS 106 includes a DeltaV™ type DCS available from Emerson Electric Co. That said, it should be understood that one or more other distributed control systems, or combinations thereof, may be employed to control the plant 104 (or a similar plant or a portion thereof) in other system embodiments (e.g., depending on the process implemented at the plant, depending on the product produced at the plant, etc.).

It should be understood that, in the system 100, the DCS 106 is configured to monitor the process at the plant 104 and to control the process, through modifying set-points, flow rates, temperatures, etc. (e.g., via one or more valves, etc.) (e.g., and to control the implements, devices, etc. associated therewith; etc.). Depending on the particular process (and/or the particular product resulting from the process), the required control may be substantially complex, where multiple inputs may impact multiple outputs at different rates, at different times, etc. Therefore, in such process having substantially complex control requirements, the DCS 106 may be configured with one or more models (and/or controllers configured to implemented the models) to control the process (e.g., controller 114 in the system 100, etc.). The controller(s), in implementing the models, etc., may be bound by rules and/or conditions, and trained to accomplish efficient operation of the process (and production of resulting product(s)).

As indicated, controller 114 is implemented in the system 100 in connection with the DCS 106 (e.g., as an implementation of the model(s) associated with the process(es) of the plant 104, etc.). The controller 114, as shown in FIG. 1, is built and/or trained (e.g., in connection with a model, etc.) in a development space 112 of the system 100 (e.g., a model development space, a controller development space, etc.). As described above, in some embodiments, the development space 112 may be included in the same cloud platform 116 as the virtual machine 102. Nonetheless, it should be appreciated that the development space 112 may be separate from the virtual machine 102 (e.g., but still within the cloud platform 116, as indicated by the dashed line in FIG. 1, etc.). In other embodiments, again, the virtual machine 102 may be separate from the cloud platform 116, and executed in a different cloud platform, or in the data center 122, or in (or as part of) a computing device at the plant 104, etc. What's more, in some example embodiments, the development space 112 may be implemented in or may include a computing device of the plant 104, or otherwise.

In this embodiment, the development space 112 includes the Azure Bonsai™ machine teaching service available from Microsoft, which is implemented to build and teach the controller 114, and to control the DCS 106 associated with the plant 104 (which, in turn, controls the process of the plant 104), etc.

As further shown in FIG. 1, the system 100 includes a computing device 118 and associated user 120. In general, while the user 120 is not involved in controlling the process and/or the plant 104, the user 120 is involved with the development space 112 (at the cloud platform 116) to generate the controller 114 to be employed for control of the process and/or the plant 104. For example, different interactions with the development space 112 may be coordinated by the user 120, such as identifying data and/or simulators, compressing files (e.g., relating to deployment of the controller server 108 and/or controller client 110, etc.), transferring/moving files, extracting files, etc. That said, it should be appreciated that one or more of the operations attributed to the user 120, via the computing device 118, may be performed by the development space 112 and/or by the virtual machine 102 independent of and/or in concert with the user 120 (and/or the computing device 118).

The controller 114 in the system 100, in general, is configured to generate certain outputs, or control signals, based on certain inputs from the process of the plant 104. In order for the controller 114 to control the process correctly and accurately, the controller 114 is trained in the development space 112, prior to being deployed. With that in mind, the process of the plant 104 is understood in terms of actions, observations, disturbances, states, and iterations, as generally defined (by way of example) in Table 1, below.

TABLE 1

| | |
|---|---|
| Actions | Inputs to the simulator or real plant that can be used to control the outcomes of physical quantities, including, for example, set-points or flow rates, etc. |
| Observations | Physically measurable quantities output by the simulator or the plant that can be used by the controller as inputs. Time update of states is defined and affected by the controller's actions. |
| Disturbances | Exogenous quantities either measured or estimated. Time update may not be affected by actions taken by the controller (e.g., feed temperature generally unchanged based on actions, etc.). |
| States | Combination of observations and disturbances. |
| Iterations | Time-step (or interval) at which the controller updates the actions (e.g., 1 minutes, twenty minutes, 1 hour, etc.). |

From the above, the development space 112 is configured then to train the controller 114 based on data consistent with Table 1 (or more or less). That said, the data upon which the controller 114 is trained may be generated by a simulator 124, or multiple simulators, associated with the development space 112 and which may approximate the response of the process of the plant 104. The simulator 124 included in the development space 112 may include, for example, ASPEN™ simulator software available from Aspen Technology, Inc., a MATLAB SIMULINK model, etc., to generate data representative of outputs of the process, based on simulated inputs to the process.

In one implementation of the present disclosure, the ASPEN™ simulator, or other simulator, or multiple of the simulators (or multiple other simulators) (e.g., as simulator 124, etc.), may be coupled to the Azure Bonsai™ machine teaching (or learning) service, whereupon the machine teaching service trains the controller 114 based on the data from the simulator(s) 124.

In another implementation of the present disclosure, the ASPEN™ simulator or other suitable simulator (e.g., as simulator 124, etc.) generates data pairs, i.e., inputs and outputs, representative of the process of the plant 104. For example, the simulator 124 (or multiple of the simulators) may be employed to collect thousands, or hundreds of thousands (e.g., at least about 300,000, etc.), or more or less, states, disturbances, actions, and resulting states, disturbance pairs, etc. (broadly, data or data pairs, etc.) The data pairs are compiled into a surrogate model (e.g., in the cloud platform 116 or the computing device 118, etc.), by use of a gradient boost decision tree (e.g., with a learning rate between 0.01 and 0.1, with a max depth between three and seven, and with a number of boosting stages between 100 and 1000, etc.). It should be appreciated that other settings of the gradient boost decision tree may be employed for other processes and/or simulation constraints, and also that a long short-term memory (LSTM) neural network architecture may also (or alternatively) be used in other embodiments. In this implementation, then, the surrogate model, or multiple surrogate models, are coupled to the Azure Bonsai™ machine teaching service, for example, or other teaching service, whereupon the teaching service trains the controller 114 based on the data (or data pairs) from the simulator(s) (e.g., simulator 124, etc.).

As shown in FIG. 1, regardless of the type of the simulator 124 (or training implemented for the controller 114), the interactions of the simulator(s) 124 in training the controller 114 are generally depicted as states and actions being passed therebetween (e.g., within the development space 112, etc.) for purposes of the training. It should be appreciated that the manner of presenting data to the machine teaching service may vary depending on the efficiencies and/or accuracies of the data, etc. What's more, the particular machine teaching service utilized in training the controller 114 may be otherwise in other embodiments depending on, for example, the development space 112 and/or the cloud platform 116, etc.

Following the above, once trained, the controller 114 is then deployed to the controller server 108. In connection therewith, it should be appreciated that the controller server 108 may include a Linux™ operating system (broadly a first operating system), and the DCS 106 may include a Windows™ operating system (broadly, a second operating system), which limits the interactions therebetween. In this embodiment, therefore, the virtual machine 102 further includes the controller client 110, which is configured, in this embodiment, to rely on the open platform communications (OPC) protocol to communicate with the DCS 106. Specifically, the controller client 110 includes at least portions of OPC UA code, which configures the virtual machine 102 to communicate with the DCS 106 at the plant 104 (e.g., with a DeltaV™ type DCS at the plant 104, etc.), along with certain additional code, which configures the virtual machine 102 (e.g., via the controller client 110, etc.) to communicate with the controller 114 (as executed in the controller server 108).

In connection with the above, for example, where the controller server 108 may include the Linux™ operating system and the DCS 106 may include the Windows™ operating system, deployment of the controller 114 requires specific libraries that are not available in the DCS 106 based on the particular configuration of the DCS 106 (e.g., for purposes of hardening, security requirements, etc.), whereby the deployment to the virtual machine 102 described herein (rather than to the DCS 106, etc.) provides the option to ensure access to and/or inclusion of the appropriate libraries and other suitable files, etc. to permit the controller 114 to operate as described herein. Similarly, other available deployment schemes (e.g., Docker from Docker, Inc.; etc.) rely on libraries and/or files not included in the DCS 106 in the illustrated embodiment, thereby further precluding use of those solutions in the system 100 described herein.

It should be appreciated that, despite the above, certain network changes may be implemented in the system 100 in order to ensure proper communication between the controller client 110 and the DCS 106 including, for example, altering rules associated with a firewall included therebetween, etc.

As such, following the deployment of the controller 114 (or in connection with the deployment), the controller server 108 (residing in the virtual machine 102) is configured to execute the controller 114 (e.g., at an RS network layer, at another network layer, etc.), while the controller client 110 (residing in the virtual machine 102) is configured to receive data from the DCS 106, transform the data for the controller 114, and transmit the transformed data to the controller 114 in the controller server 108 (and vice-versa for data transmitted from the controller 114, via the controller server 108 and controller client 110, to the DCS 106), etc. In addition, the controller client 110 may be configured to provide data filtering and conditioning of the data, as needed or desired.

Specifically, as it relates to deploying the controller server 108 and the controller client 110 to the virtual machine 102, the user 120, for example, may combine compressed files for the controller server 108 and the controller client 110, by extracting the files to a folder structure, and then compressing the folder structure (e.g., by zipping the folders, etc.). The user 120 may then initialize the controller server 108 and the controller client 110 by accessing the virtual machine 102 and copying the compressed folder to the virtual machine 102. The user 120 may then extract the contents of the folders to the virtual machine 102, and thereafter, the controller server 108 and the controller client 110 are executed in the virtual machine 102. In this example embodiment, the controller client 110 is configured to generate a log of communications between the controller server 108, the controller client 110, and the DCS 106. By accessing the log of communications, at the computing device 118, the user 120 is able to confirm the active and/or correct communication between the controller server 108 and the controller client 110, and also the DCS 106 and the controller client 110.

Thereafter, communication is supported between the controller server 108 and the DCS 106 (via the controller client 110), whereby the controller 114 is configured to provide control inputs to the DCS 106 and the DCS 106 is configured to report outputs to the controller server 108, via the controller client 110. The controller client 110, then, is configured to transform data and provide communication therebetween. As an example, Table 2 provides sample inputs and outputs, through the controller client 110, as may be included in the log communications generated by the controller client 110.

TABLE 2

NodeID ns=2;s=0:01LI415-MED_CALC/PV_2H.CV : Value 62.40269
NodeID ns=2;s=0:01LI415-MED_CALC/PV_3H.CV : Value 62.33083
NodeID ns=2;s=0:01LI415-MED_CALC/PV_4H.CV : Value 61.86353
NodeID ns=2;s=0:01LI415-MED_CALC/PV_5H.CV : Value 61.61609
NodeID ns=2;s=0:01LI415-02/AI1/PV.CV : Value 74.60716
NodeID ns=2;s=0:01LI415-MED_CALC/PV.CV : Value 61.87515
NodeID ns=2;s=0:01LC460-05/AI1/PV.CV : Value 71.29861
NodeID ns=2;s=0:BRAIN_TEST/SCAN_UPDATE_MSEC.CV : Value 3600000

It should be appreciated that the virtual machine 102, the plant 104, and the DCS 106 are each coupled to one or more networks, as indicated by the arrowed lines in FIG. 1. The networks may each include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. For example, the virtual machine 102 may be implemented in a cloud network (as described above), while the DCS 106 may be implemented in a private network, which is accessible to the virtual machine 102, via one or more separate, public networks, etc.

Figure 2:
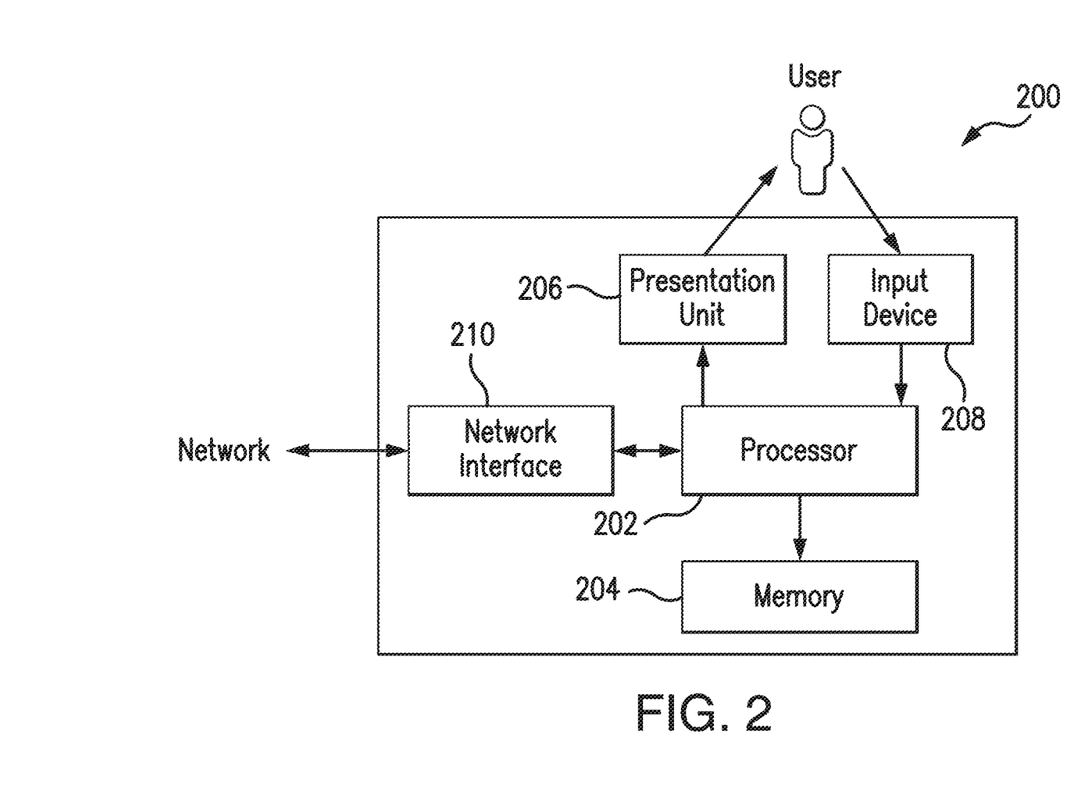
FIG. 2 is a block diagram of an example computing device, that may be used or otherwise implemented in the example system of FIG. 1.

FIG. 2 illustrates example computing device 200, which is suitable for use in the system 100. By way of example (and without limitation), the computing device 200 may include one or more servers, workstations, personal computers, laptops, tablets, PDAs, telephones (e.g., cellular phones, smartphones, other phones, etc.), combinations thereof, etc. as appropriate. In the system 100 (of FIG. 1), the cloud platform 116 (generally), the plant 104, the DCS 106, and the computing device 118 are each associated with, or implemented in, or included, a computing device consistent with and/or similar to the computing device 200. With that said, it should be appreciated that the system 100 is not limited to the computing device 200, as different computing devices and/or arrangements of computing devices may be used. It should also be appreciated that different components and/or arrangements of components may be used in other computing devices. Further, in various example embodiments, the computing device 200 may include multiple computing devices located in close proximity, or distributed over a geographic region (such that each computing device 200 in the system 100 may represent multiple computing devices), so long as the computing devices are specifically configured to function as described herein.

With reference to FIG. 2, the illustrated computing device 200 generally includes a processor 202, and a memory 204 that is coupled to (and that is in communication with) the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above are examples only, and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, thumb drives, tapes, flash drives, hard disks, and/or any other type of volatile or nonvolatile physical or tangible computer-readable media. The memory 204 may be configured to store, without limitation, process operations, process constraints and/or controls, output data from processes, input data for processes, process data from plants (e.g., actions, observations, disturbances, states, episodes, iterations and terminal conditions, etc.), controller rules and/or conditions, and/or any other types of data discussed herein and/or suitable for use as described herein, etc.

Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer-readable storage media. Such instructions often improve the efficiencies and/or performance of the processor 202 and/or other computer system components configured to perform the one or more functions herein, whereby the computing device 200 may be transformed into a special purpose computing device upon performing (or based on performance of) the one or more of the operations. It should be appreciated that the memory 204 may include a variety of different memories, each implemented in one or more of the functions or processes described herein.

In the example embodiment, the computing device 200 also includes a presentation unit 206 that is coupled to (and that is in communication with) the processor 202 (however, it should be appreciated that the computing device 200 could include output devices other than the presentation unit 206, etc.). The presentation unit 206 is configured to output information, visually or audibly, for example, to a user of the computing device 200 (e.g., control settings, process data, etc.), etc. And, various interfaces may be displayed at computing device 200, and in particular at presentation unit 206, to display certain information in connection therewith. In some examples, the computing device 200 may cause the interfaces to be displayed at a display device of another computing device, including, for example, a server hosting a website having multiple webpages, etc. The presentation unit 206 may include, without limitation, a liquid crystal display (LCD), a light-emitting diode (LED) display, an organic LED (OLED) display, speakers, etc. In some embodiments, the presentation unit 206 may include multiple devices.

The computing device 200 further includes an input device 208 that receives input from the user of the computing device 200. The input device 208 is coupled to (and is in communication with) the processor 202 and may include, for example, a keyboard, a pointing device, a mouse, a touch sensitive panel (e.g., a touch pad or a touch screen, etc.), another computing device, and/or an audio input device. Further, in some example embodiments, a touch screen, such as that included in a tablet, a smartphone, or similar device, may behave as both an output device and an input device. In at least one example embodiment, an output device and/or an input device are omitted from a computing device.

In addition, the illustrated computing device 200 includes a network interface 210 coupled to (and in communication with) the processor 202 (and, in some embodiments, to the memory 204 as well). The network interface 210 may include, without limitation, a wired network adapter, a wireless network adapter, a mobile telecommunications adapter, or other device capable of communicating to one or more different networks, including the network(s) described above for the system 100. In some example embodiments, the computing device 200 includes the processor 202 and one or more network interfaces incorporated into or with the processor 202. In various embodiments herein, the input device 208 and/or the network interface 210 may include, among other things, a GPS antenna suitable to capture GPS signals for processing by the processor 202 to determine the location of the computing device 200. In addition (or alternatively), in various embodiments herein, the computing device 200 may rely on additional or other network signals, via network interface 210, to determine its location. With that said, it should be appreciated that any suitable operations to determine locations, by processors, based on GPS signals (or other network signals) may be used.

Figure 3:
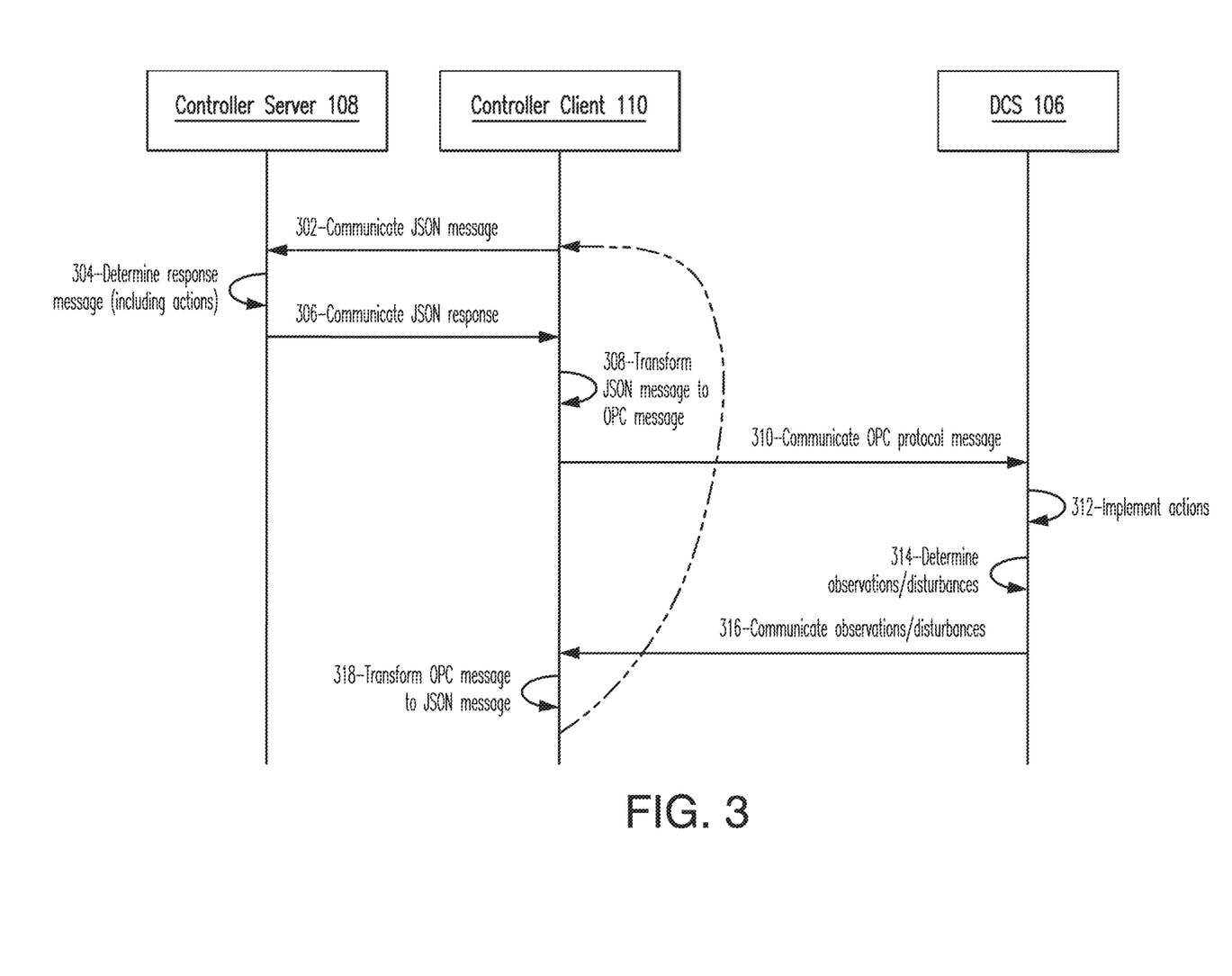
FIG. 3 is an example method suitable for use with the system of FIG. 1 for providing a virtual machine, hosting a model (e.g., at or via a controller, etc.), linked to a control system implemented at the production location, for example, in a process at a manufacturing plant or other production location, etc., whereby the model is executed in controlling the process, via the virtual machine link.

FIG. 3 illustrates example method 300 for use in controlling a distributed control system, via a controller executed in a virtual machine, to thereby control production of a product at a plant associated with the control system. The example method 300 is described as implemented in the system 100 of FIG. 1. The method 300, however, could be implemented otherwise in other embodiments. Further, for purposes of illustration, the example method 300 may be described herein with reference to the computing device 200. And, just as the methods herein should not be understood to be limited to the example system 100, or the example computing device 200, the systems and the computing devices herein should not be understood to be limited to the example method 300.

In this example embodiment, prior to implementation of the controller 114 in the virtual machine 102 (and related model(s) associated with the process(es) of the plant 104, etc.), the controller 114 is trained in the development space 112. As explained above, the training of the controller 114 is based on a simulation of the process of the plant 104. The simulation may provide data, which is fed into a machine teaching service of the development space 112. Additionally, or alternatively, again, as indicated above, the simulation (or simulations) may define specific data pairs, expressing inputs and outputs to/from the process of the plant 104, which are then exposed to one or more modeling techniques in the development space 112 (e.g., gradient boost, LSTM, etc.) to provide a data model for training the controller 114. In either instance, the development space 112 relies on the simulator(s)/data model(s) to train the controller 114 to control inputs for the process at the plant 104 (e.g., setpoints, flow rates, temperatures, etc.), based on the states, observations and/or disturbances of the process reflected in the data.

Thereafter, the controller 114 is compiled into an executable, which is then deployed to the controller server 108 in the virtual machine 102. In particular, when compiled, the controller 114 and supporting files (e.g., as part of the controller server 108, etc.), etc., are compressed (e.g., into a ZIP file, etc.) (as generally described above in the system 100).

In connection therewith, the controller client 110 is prepared as well. In particular, the source code for the controller client 110 is opened and validated (e.g., to confirm that the controller states and the OPC states (e.g., from the OPC UA code, etc.) are consistent with the controller server 108, as trained; etc.). As part thereof, credentials associated with the OPC UA may be provided/required. Thereafter, the source code is compiled to create an executable version of the same. And, the controller client 110 is compressed along with supporting files (e.g., .NET libraries, etc.) (e.g., into a ZIP file, etc.).

Next, an auto-restart folder is identified, and the controller server 108 and the controller client 110 are extracted (from the compressed files) to the auto-restart folder, respectively (e.g., into \auto-restart\server and \auto-restart\client, etc.). The auto-restart folder is then compressed, for example, into a ZIP file. And, the compressed file for the auto-restart is transferred to the virtual machine 102, whereupon the files are extracted from the compressed file and executed, by the virtual machine 102 (e.g., automatically via task scheduler, etc.) (e.g., in connection with one or more Python packages from Python Software Foundation installed at the virtual machine 102, etc.).

At this point, the controller server 108 is in communication with (and is capable of communicating with) the controller client 110, which in turn, is in communication with (and is capable of communicating with) the DCS 106 of the plant 104, as evidenced by the log files being populated with messages (as indicated above with respect to the system 100 and FIG. 1).

As for method 300, the controller client 110 communicates with the controller server 108, via packets or messages consistent, for example, with the JSON (JavaScript Object Notation) format (broadly, a message in a first message format or first communication format or first message protocol) in this embodiment (or with other formats or protocols in other embodiments). At 302, then, the controller client 110 communicates the conditions of the process of the plant 104 (e.g., current conditions, past conditions, etc.) (e.g., a state of the process, etc.), via a JSON message, as shown in Table 3. The example message in Table 3 includes different conditions, including, among other things, an evaporator pressure level (EVP), and averages and listings relating to an evaporator feed tank (EFT) (e.g., as included in, or part of the process performed at, the plant 104 of FIG. 1; etc.).

TABLE 3

| 1 | { |
|---|---|
| 2 | "EFT_level": 65.37 |
| 3 | "avg_EFT_level": 60.52 |
| 4 | "avg_EFT_level_hist": [61.01, 59.64, 64.75, 60.69] |
| 5 | "EVP_level": 72.88 |
| 6 | } |

Then, at 304, the controller server 108 employs the controller 114 to determine a response to the message (as received from the controller client 110), which, in this example, includes one or more actions. The action(s) provide control signals to the process at the plant 104, which are intended, as predicted by the controller 114, to affect the process in a desired manner. In particular, as shown in Table 4, the controller server 108 may determine, as the actions, an evaporator pressure set-point and a steam pressure set-point. And, in turn, the controller server 108, at 306, communicates the response message, as a JSON message, to the controller client 110 (e.g., as shown in Table 4, etc.).

TABLE 4

```
1    {
2        "EVP_press_SPact": 1.0,
3        "stem_press_SPact": -0.100000000149
4    }
```

At 308, the controller client 110 transforms the JSON message received from the controller server 108 into a message for the DCS 106 (e.g., into an OPC message, etc.) (broadly, a message in a second message format a second communication format or second message protocol). In particular, for example, the controller 114 may read the data as or in JSON format, extract the data, and assign the data to pre-defined classes, for example, corresponding to states and actions, etc. (e.g., whereby communication between the pre-defined classes and the DCS 106 is defined by OPC protocol, etc.).

Then, at 310, the controller client 110 communicates the message to the DCS 106 (e.g., in the OPC format, etc.). In response, the DCS 106 implements the actions included in the response message at the plant 104, at 312, and further determines, at 314 (at one or more intervals), observations and/or disturbances of the process (e.g., based on the actions, etc.). The DCS 106 then communicates, at 316, at one or more intervals, one or more conditions (or states) of the process and/or the plant 104 to the controller client 110 (e.g., in the OPC format, etc.). At 318, the controller client 110 transforms the message from the DCS 106 (e.g., in the OPC format, etc.) to a JSON message for the controller server 108. Based on the pre-defined classes, the states indicated in the OPC data are assigned to JSON format using a HTTP function.

The controller client 110 then returns (as indicated by the dotted line in FIG. 3) to step 302 to communicate the JSON message to the controller server 108.

The method 300 repeats, as necessary or desired, to provide communication between the controller 114, included in the controller server 108, and the DCS 106, to implement control of the process at the plant 104 based on the controller 114. As shown in FIG. 3, the interactions between the controller server 108, the controller client 110, and DCS 106 may be defined according to specific iterations, which may be at any suitable interval. For example, in method 300, different states are provided back to the controller client 110 at about ten second iterations (or intervals) (e.g., at step 316, etc.). The controller server 108 may likewise provide control signals and/or instructions to the DCS 106, via the controller client 110, at a similar intervals or iterations (e.g., at about ten second intervals or iterations, etc.). That said, other iterations (or intervals) may be utilized (e.g., about five second or less intervals, about 10 second or less intervals, about 20 second or less intervals, about one minute or less intervals, etc.). For instance, such iterations may be based on and/or may be dependent on (or defined by) the controller 114 and the data passed between the controller server 108, the controller client 110, and the DCS 106, as well as on the specific process implemented in the plant 104, whereby the iterations may be longer or shorter than 10 seconds.

In view of the above, the systems and methods herein provide for the functionality described, which in turn may reduce a number of states required for processes at plants (e.g., states are only used if their corresponding sensors are present at the plants, etc.) and corresponding disturbances, and/or may provide for a more efficient running of processes at plants (e.g., automated adjustment of high-pressure steam flowrates to reduce process variations and maintain EFT liquid levels within suitable ranges, reduced steam usage, etc. in evaporative crystallization processes; etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations and/or steps: (a) receiving, by a controller client included in a virtual machine hosted in a cloud platform, a message from a distributed control system (DCS) of a manufacturing plant associated with a process to produce a product, the manufacturing plant including a component for controlling a set-point of the process, wherein the message is in a first message format specific to the DCS; (b) transforming, by the controller client, the message received from the DCS from the first message format into a second message format different from the first message format; (c) communicating, by the controller client, the message in the second message format to a controller server included in the virtual machine; (d) receiving, by the controller client, a response message from the controller server in the second message format, wherein the response message includes an action to be implemented at the manufacturing plant, as determined by a model (and/or a controller implementing the model whereby the controller may be considered an implementation of the model) specific to the process at the manufacturing plant, based on the operational state of the process; (e) transforming, by the controller client, the respond message from the second message format to the first message format; (f) communicating, by the controller client, the response message including the action, in the first message format, to the DCS; and (g) in response to the response message in the first message format, adjusting, by the DCS, the component of the manufacturing plant to alter the set-point of the process based on the action included in the response message.

With that said, example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for controlling production of products at a manufacturing plant, the method comprising:
   receiving, by a controller client included in a virtual machine hosted in a cloud platform, a message from a distributed control system (DCS) of a manufacturing plant associated with a process to produce a product, the manufacturing plant including a component for controlling a set-point of the process, wherein the message is in a first message format specific to the DCS;
   transforming, by the controller client, the message received from the DCS from the first message format into a second message format different from the first message format;
   communicating, by the controller client, the message in the second message format to a controller server included in the virtual machine;
   receiving, by the controller client, a response message from the controller server in the second message format, wherein the response message includes an action to be implemented at the manufacturing plant, as determined by a controller specific to the process at the manufacturing plant, based on an operational state of the process;
   transforming, by the controller client, the response message from the second message format to the first message format;
   communicating, by the controller client, the response message including the action, in the first message format, to the DCS; and then
   in response to the response message in the first message format, adjusting, by the DCS, the component of the manufacturing plant to alter the set-point of the process based on the action included in the response message.

2. The computer-implemented method of claim 1, wherein the first message format is consistent with an open platform communication (OPC) protocol.

3. The computer-implemented method of claim 2, wherein the second message format is consistent with a JavaScript Object Notation (JSON) protocol.

4. The computer-implemented method of claim 2, wherein the virtual machine includes a first operating system; and
   wherein the DCS includes a second operating system, different than the first operating system.

5. The computer-implemented method of claim 1, wherein the set-point includes one of an evaporator pressure set-point and/or a steam pressure set-point; and
   wherein the product includes glyphosate.

* * * * *